(12) United States Patent
Goddard (10) Patent No.: US 6,883,110 B1
(45) Date of Patent: Apr. 19, 2005

(54) SYSTEM AND METHOD FOR PROVIDING A DATA BACKUP OF A SERVER ON CLIENT SYSTEMS IN A NETWORK

(75) Inventor: Mark D. Goddard, Foothill Ranch, CA (US)

(73) Assignee: Gateway, Inc., Irvine, CA (US)

( * ) Notice: Subject to any disclaimer, the term of this patent is extended or adjusted under 35 U.S.C. 154(b) by 716 days.

(21) Appl. No.: 09/883,576

(22) Filed: Jun. 18, 2001

(51) Int. Cl.$^7$ ............................................. G06F 11/00
(52) U.S. Cl. ............................................. 714/6; 714/13
(58) Field of Search .............................. 714/6, 2, 4, 5, 714/7, 13, 15, 16, 20

(56) References Cited

U.S. PATENT DOCUMENTS

| | | | | |
|---|---|---|---|---|
| 5,515,502 A | | 5/1996 | Wood | 395/182.13 |
| 5,802,297 A | | 9/1998 | Engquist | 395/200.42 |
| 5,819,030 A | | 10/1998 | Chen et al. | 395/200.5 |
| 5,828,569 A | | 10/1998 | Fisher | 364/187 |
| 5,890,156 A | | 3/1999 | Rekieta et al. | 707/10 |
| 5,920,702 A | | 7/1999 | Bleidt et al. | 395/200.61 |
| 6,029,254 A | | 2/2000 | Andrews | 714/6 |
| 6,052,797 A | | 4/2000 | Ofek et al. | 714/6 |
| 6,122,629 A | | 9/2000 | Walker et al. | 707/8 |
| 6,505,216 B1 | * | 1/2003 | Schutzman et al. | 707/204 |
| 2001/0047482 A1 | * | 11/2001 | Harris et al. | 713/200 |

OTHER PUBLICATIONS

Recovery in the Calypso file system; wysiwyg://95/http://access.nerac.com/WN . . . 015E709&STITEM=0028&APP=xxx&SCROLL=BACK; Dec. 6, 2000.

Resource allocation for distributed systems with fault tolerant nodes; wysiwyg://75/http://access.nerac.com/WN . . . 015E709&STITEM=0047&APP=xxx&SCROLL=BACK; Dec. 6, 2000.

High–availability scheme using data partitioning for cluster systesm; wysiwyg://59/http://access.nerac.com/WN . . . 015E709&STITEM=0061&APP=xxx&SCROLL=BACK; Dec. 6, 2000.

Data Backup Method, Mirroring Device, and Its Control Method; http://www.micropat.com/commercialfiles/nerac/00693795/2808102/JP08272666.html; Dec. 6, 2000.

Efficient distributed backup with delta compression; wysiwyg://30/http://access.nerac.com/WN . . . temno=&ordertp=undefined&app=undefined; Dec. 6, 2000.

Load sharing in hypercube–connected multicomputers in the presence of node failures;wysiwyg://33/http://access.nerac.com/WN . . . emno=10&ordertp=undefined&app=undefined; Dec. 6, 2000.

Decomposition of object–oriented programs for fault tolerant computing in distributed environment; wysiwyg://35/http://access.nerac.com/WN . . . emno=21&ordertp=undefined&app=undefined; Dec. 6, 2000.

Replication strategies for high availability and disaster recovery; wysiwyg://61/http://access.nerac.com/WN . . . 015E&STITEM=0060&APP=xxx&SCROLL=BACK; Dec. 6, 2000.

* cited by examiner

*Primary Examiner*—Dieu-Minh Le
(74) *Attorney, Agent, or Firm*—Jeffrey A. Proehl; Ross Hunt, Jr.; Stites & Harbison PLLC (57) ABSTRACT

A system and a method are disclosed for providing a backup of electronic data on a server appliance utilizing a plurality of client information handling systems in a network. The present invention provides a redundant, distributed backup of the server appliance suitable for use on an unmanaged network of client information handling systems. Portions of electronic data stored on the server appliance are transferred over the network and stored on the plurality of client information handling systems. The portions of the electronic data stored on the plurality of client information handling systems are suitable for restoring substantially all of the electronic data stored on the server appliance. Thus, an additional backup server is not required. Storage of an entire backup copy of the server appliance data on a medium or set of media, as well as administration of such a medium or set of media, are also not required.

25 Claims, 7 Drawing Sheets

SYSTEM AND METHOD FOR PROVIDING A DATA BACKUP OF A SERVER ON CLIENT SYSTEMS IN A NETWORK

FIELD OF THE INVENTION

The present invention generally relates to the field of the backup and reconstruction of electronic data, and particularly to a system and method for providing a distributed data backup of a server on client systems in a network.

BACKGROUND OF THE INVENTION

The persistent storage of data is one of the most important aspects in the modern economy. From e-commerce enterprises to small businesses, the safe storage of electronic business, transactional data, application data, and the like is necessary for continuing even the most basic business functions. However, typical data backup methods employed to save this desirable data may require dedicated hardware. For example, a dedicated backup server may be required to create and maintain a backup copy of such a large amount of data. Additionally, it is typically necessary to store an entire backup copy of the data on a single backup medium or set of media. Further, administration and management of the backup medium or set of media is required. Also, typical data backup methods may take a significant time to perform. For example, a tape backup of data in even the smallest of offices may take hours to perform. The undesirability of these options has resulted in infrequent utilization, thereby resulting in risk to the unsaved data.

Additionally, in many server appliance/client implementations, client information handling systems utilized in the system may contain large amounts of storage space. This space may go unutilized in typical implementations due to the frequent use of server appliance storage and server applications, which results in decreased usage of client information handling system storage. For example, users of client information handling systems may access applications running on the server appliance during the course of a typical day. By utilizing these applications and storage almost exclusively, the vast majority of the storage space on the client information handling system itself may go unutilized.

Therefore, it would be desirable to provide a system and method for providing a data backup of a server on client systems in a network.

SUMMARY OF THE INVENTION

Accordingly, the present invention is directed to a system and a method for providing a backup of electronic data on a server appliance utilizing a plurality of client information handling systems in a network. The present invention provides a redundant, distributed backup of the server appliance suitable for use on an unmanaged network of client information handling systems. The client information handling systems are configured to receive portions of the electronic data stored on the server appliance in order to use the frequently underutilized storage space on the client information handling systems. By virtue of the present invention, data may be backed-up onto existing client information handling systems over a network connection, thereby resulting in an efficient and user friendly data backup tool. It eliminates the need for a dedicated backup server to create and maintain a backup copy of the data. It also eliminates the need for storage of an entire backup copy of the data on a single medium or set of media, as well as administration and management of such a medium or set of media.

In a first aspect of the present invention, a system suitable for providing a backup of electronic data includes a network, a server appliance coupled to the network, and a plurality of client information handling systems coupled to the server appliance over the network. The server appliance includes a data storage device suitable for storage of electronic data. Each of the client information handling systems also includes a data storage device suitable for storage of the electronic data stored on the server appliance. Portions of the electronic data stored on the server appliance are transferred over the network and stored on the plurality of client information handling systems. The portions of the electronic data stored on the plurality of client information handling systems are suitable for restoring substantially all of the electronic data stored on the server appliance. Thus, an additional backup server is not required to create and maintain a backup copy of the server appliance data. Storage of an entire backup copy of the server appliance data on a single medium or set of media, as well as administration and management of such a medium or set of media, are also not required.

In a second aspect of the present invention, a method of providing a backup of electronic data on a server appliance utilizing a plurality of client information handling systems communicatively coupled to the server appliance over a network includes receiving a request for the backup of the electronic data stored on the server appliance. The electronic data stored on the server appliance is configured for transfer to the plurality of client information handling systems over the network. Portions of the electronic data are then transferred from the server appliance to the plurality of client information handling systems and stored thereon. The portions of the electronic data stored on the plurality of client information handling systems are suitable for restoring substantially all of the electronic data stored on the server appliance.

In a third aspect of the present invention, the portions of the electronic data stored on the server appliance are transferred over the network and stored on the plurality of client information handling systems such that, if at least one of the plurality of client information handling systems is unavailable and includes one of the portions of the electronic data, the portions of the electronic data stored on other available ones of the plurality of client information handling systems are suitable for restoring substantially all of the electronic data stored on the server appliance.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention, and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, embodiments of the present invention are shown. Data stored on a server appliance, either for utilization of the server appliance itself, or by client information handling systems operably connected to the server appliance, may contain necessary and desirable data for users of the server/client system. However, typical data backup methods employed to save this desirable data may require dedicated hardware and may take a significant time to perform. The undesirability of these options has resulted in infrequent utilization, thereby resulting in risk to the unsaved data. However, by utilizing the present invention, data may be backed-up utilizing existing client information handling systems and network connections, thereby resulting in an efficient and user friendly data saving tool capable of being implemented by a user without the hardship previously encountered. It eliminates the need for a dedicated backup server to create and maintain a backup copy of the data. It also eliminates the need for storage of an entire backup copy of the data on a single medium or set of media, as well as administration and management of such a medium or set of media.

Figure 1:
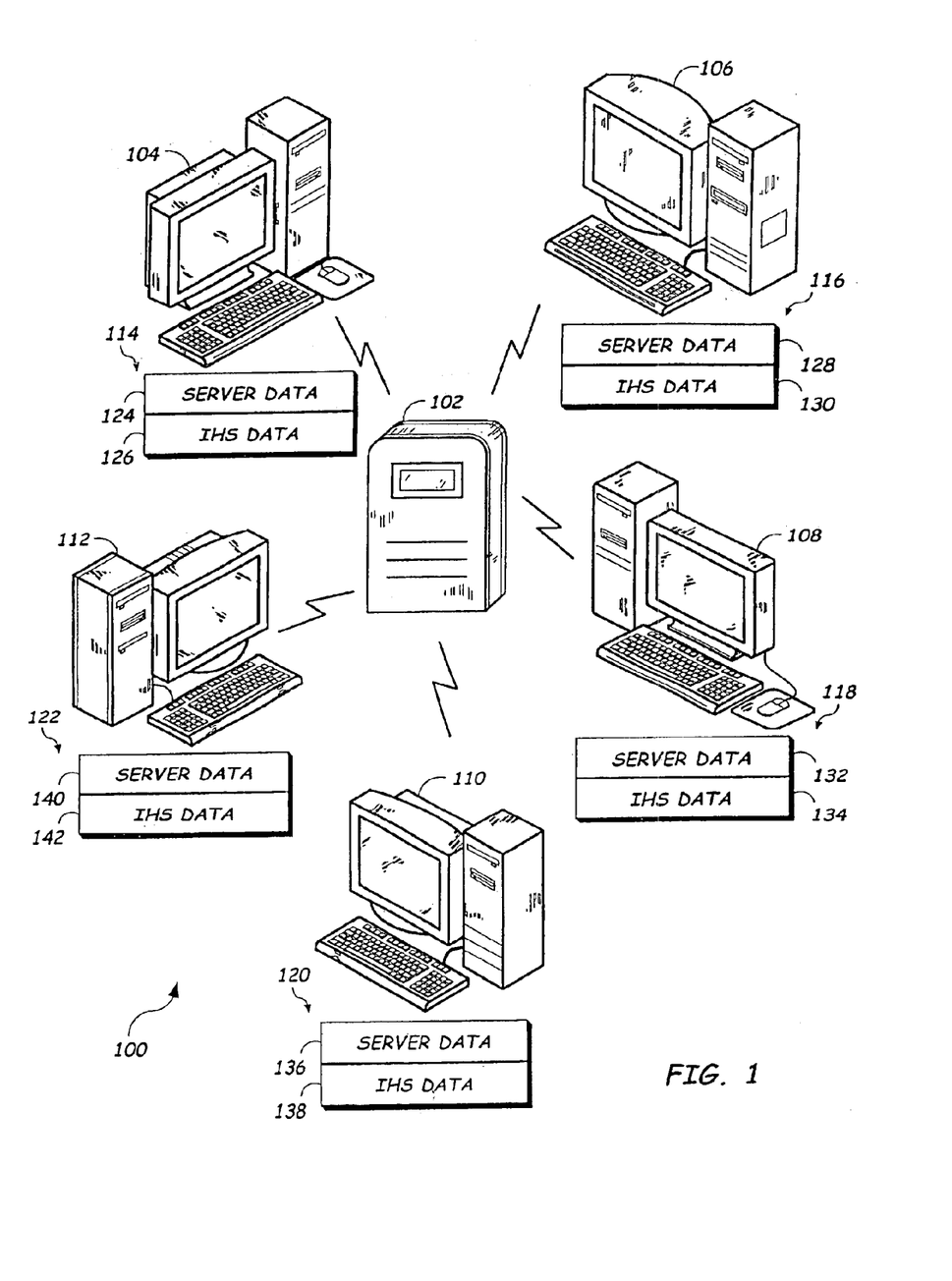
FIG. 1 is an illustration of an embodiment of the present invention in which a server appliance utilizes client information handling systems coupled to the server appliance over a network to provide a distributed backup.

Referring now to FIG. 1, an embodiment 100 of the present invention is shown wherein a server appliance utilizes client information handling systems coupled to the server appliance over a network to provide a distributed backup of the server appliance. A server appliance 102 may provide centralized functionality to a plurality of client information handling systems 104, 106, 108, 110 & 112, such as programs, Internet access and the like. To provide the functionality, a variety of data, such as programs, documents, executables, settings, applications and the like, are stored on the server appliance 102. Additionally, the server appliance 102 may also store data from the client information handling systems 104, 106, 108, 110 & 112 which access the server appliance. Thus, a great deal of important data may be stored on the server appliance 102, loss of which may cause great hardship on users of the client information handling systems 104, 106, 108, 110 & 112. Although the server appliance 102 may provide some centralized functionality to the plurality of client information handling systems 104, 106, 108, 110 & 112, the server appliance 102 may not administer and manage the network or the plurality of client information handling systems 104, 106, 108, 110 & 112.

In many server appliance/client implementations, the client information handling systems 104, 106, 108, 110 & 112 utilized in the system may contain large amounts of storage space. This space may go unutilized in typical implementations due to the frequent use of server appliance 102 storage and server applications, which results in decreased usage of client information handling system 104, 106, 108, 110 & 112 storage. For example, users of the client information handling systems 104, 106, 108, 110 & 112 may access applications running on the server appliance 102 during the course of a typical day. By utilizing these applications and storage almost exclusively, the vast majority of the storage space on the client information handling systems 104, 106, 108, 110 & 112 may go unutilized. Therefore, it may be preferable to utilize this storage space on the client information handling systems 104, 106, 108, 110 & 112 to provide backup data for the server appliance 102. Additionally, accessing storage space on the client information handling systems 104, 106, 108, 110 & 112 may be achieved in a shorter period of time than utilizing previous backup methods, such as a tape backup and the like.

For instance, the client information handling systems 104, 106, 108, 110 & 112 may each include storage devices 114, 116, 118, 120 & 122. The storage devices typically include information handling system data 126, 130, 134, 138 & 142, such as an operating system, system settings, applications, data, and the like, to be utilized locally by each respective client information handling system 104, 106, 108, 110 & 112. By utilizing the present invention, the storage devices 114, 116, 118, 120 & 122 may also be utilized to store server data 124, 128, 132, 136 and 140 to provide a backup of data included on the server appliance 102. The portions of the storage devices 114, 116, 118, 120 & 122 utilized to store the server data 124, 128, 132, 136 & 140 may be designated as shared memory accessible by the server appliance 102 over the network, or alternatively, may be administered by a proprietary service provided by an application over the network, as contemplated by one skilled in the art. In this way, the storage devices 114, 116, 118, 120 & 122 of the client information handling systems 104, 106, 108, 110 & 112 coupled to the server appliance 102 may be utilized to provide a data backup of the server appliance 102 without requiring a dedicated backup server or additional backup medium. Upon failure or replacement of the server appliance 102, all or substantially of the data included on the server appliance 102 may be restored based solely on the server data 124, 128, 132, 136, & 140 stored on the client information handling systems 104, 106, 108, 110 & 112.

Figure 2:
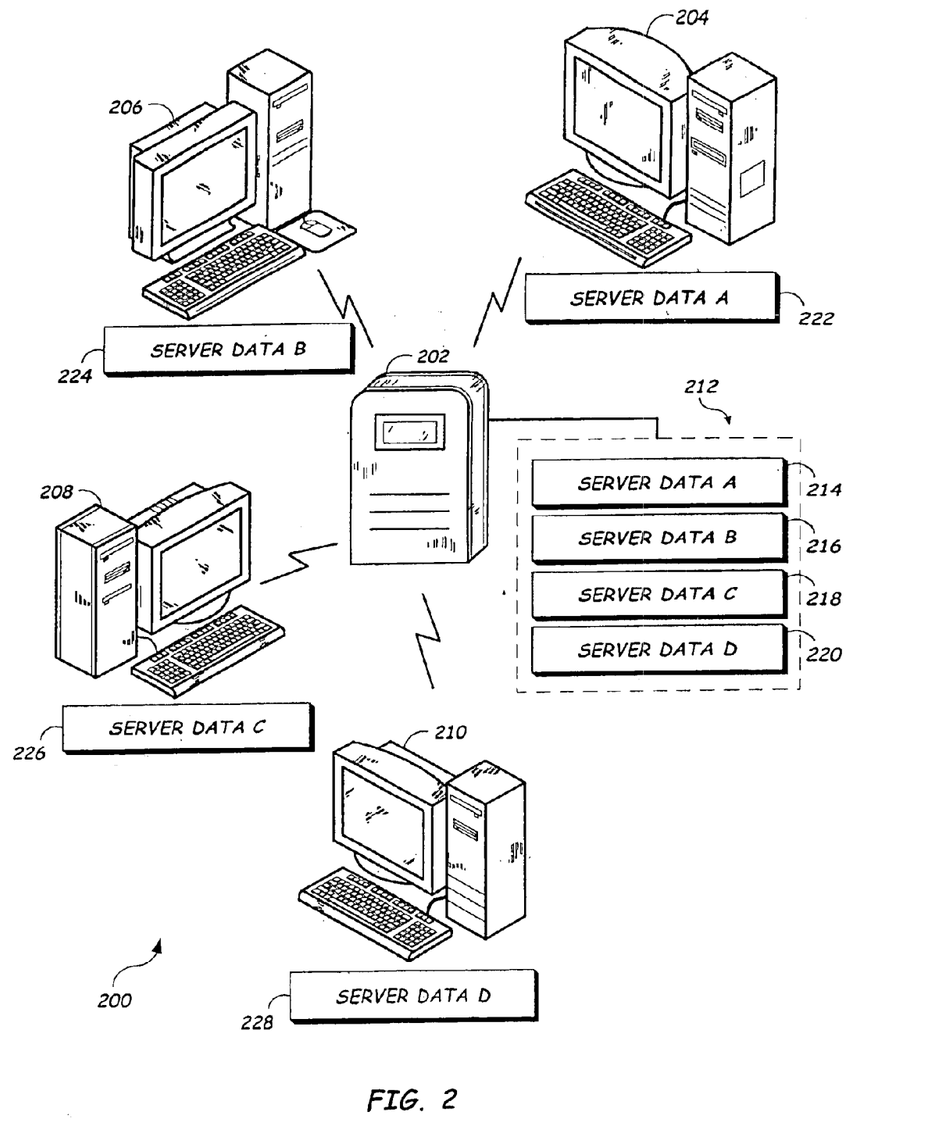
FIG. 2 is an illustration depicting an embodiment of the present invention wherein server data stored on a server appliance is portioned and distributed amongst a plurality of client information handling systems for restoration of the server appliance data in the event of server appliance failure.

Referring now to FIG. 2, an embodiment 200 of the present invention is shown wherein server data stored on a server appliance is portioned and distributed amongst a plurality of client information handling systems for restoration of the server appliance data in the event of server appliance failure, replacement, and the like. A server appliance 202 includes server appliance storage 212, such as a disk drive, RAID array, optical storage, removable storage, and the like, suitable for storing electronic data. Server data included on the storage device 212 may be configured for distribution to a plurality of client information handling systems 204, 206, 208 & 210 in accordance with various redundant array of independent disks (RAID) or other data partitioning and redundancy schemes, as contemplated by one skilled in the art.

For example, server data may be divided into portions, such as server data A 214, server data B 216, server data C 218 and server data D 220. These portions may then be transferred from the server appliance 202 over a network to the client information handling systems 204, 206, 208 & 210 for storage. In this instance, server data A 222 corresponding to the server data A 214 portion from the server appliance 202 is stored on a first client information handling system 204. Likewise, server data B 224, server data C 226 and server data D 228 are each stored on respective client information handling systems 206, 208 & 210. In this way, utilizing available storage space of the client information handling systems 204, 206, 208 & 210 may provide a distributed backup of data on the server 202. Upon server 202 replacement, failure, and the like, all or substantially all of the server data 212 stored on the server 202 may be restored based solely on the server data portions 222, 224, 226, & 228 stored on the client information handling systems 204, 206, 208 & 210. Further, a backup may be provided without specialized hardware, such as a dedicated backup server or an additional backup medium, in a fast and efficient manner by utilizing available network connections and storage devices.

Figure 3:
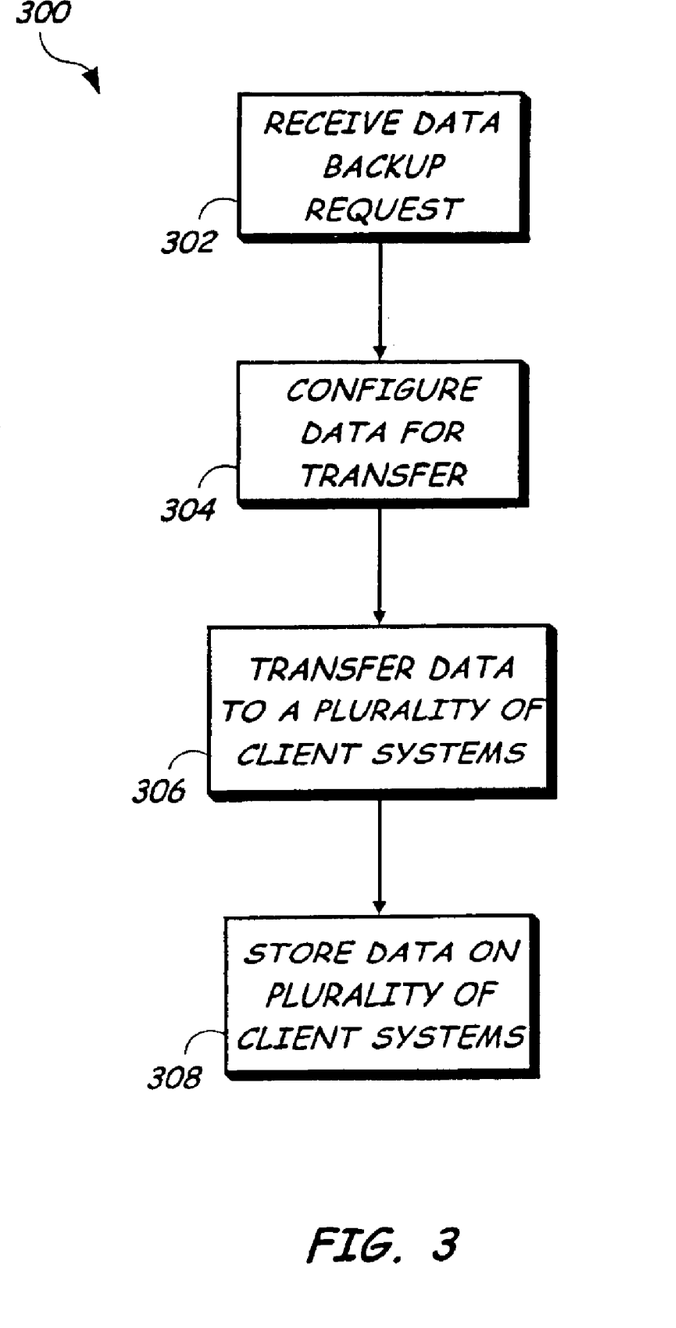
FIG. 3 is a flow diagram illustrating an exemplary method of the present invention wherein data included on a server appliance is configured and transferred to a plurality of client information handling systems.

Referring now to FIG. 3, an exemplary method 300 of the present invention is shown wherein data included on a server appliance is configured and transferred to a plurality of client information handling systems. In step 302, a request is received to provide a data backup of a server appliance. In step 304, the data of the server appliance is configured for transfer in accordance with various RAID or other data partitioning and redundancy schemes as contemplated by one skilled in the art. In step 306, the configured data is then transferred to a plurality of client information handling systems over a network. The transferred data is then stored on the plurality of client information handling systems in step 308. Thus, server data may be distributed to the plurality of client information handling systems to provide a data backup of the server appliance without requiring a dedicated backup server or additional backup medium. Upon replacement, failure, and the like of the server appliance, all or substantially of the server data stored on the server appliance may be restored based solely on the portions of data stored on the client information handling systems.

Figure 4:
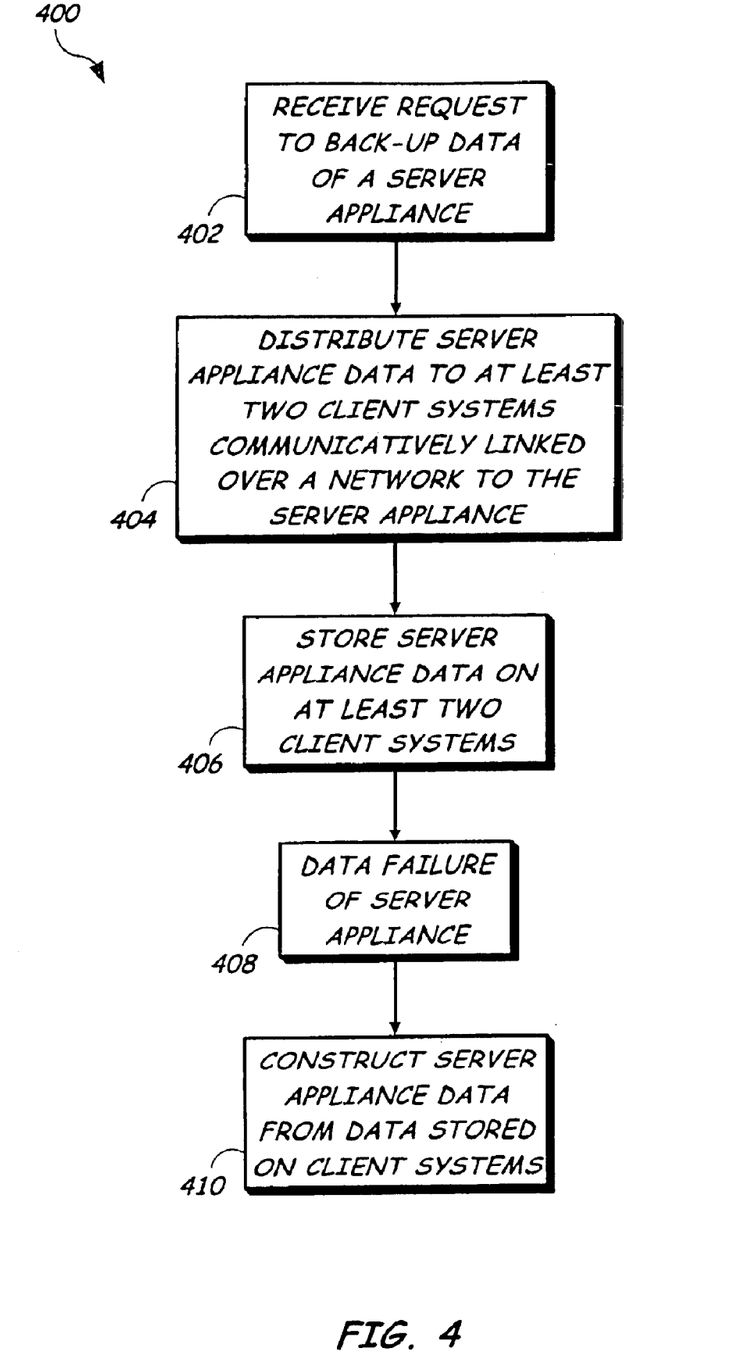
FIG. 4 is a flow diagram depicting an exemplary method of the present invention wherein server data is distributed to a plurality of client information handling systems to enable restoration of server data in the event of server appliance failure.

For example, as described in the exemplary method 400 shown in FIG. 4, server data may be distributed to a plurality of client information handling systems to enable restoration of server data in the event of server appliance failure, replacement, and the like. In step 402, a request is received to back-up data of a server appliance. In step 404, the server appliance data is distributed to at least two client information handling systems communicatively coupled to the server appliance over a network, such as a local area network (LAN) and the like. The server data is stored on at least two client information handling systems in step 406. Thus, in the event of data failure of the server appliance in step 408, such as storage device failure, server appliance device failure, and the like, all or substantially of the server data may be reconstructed from data stored on the at least two client information handling systems in step 410. The server appliance data may be divided into portions and distributed, for example, in accordance with various RAID schemes, as contemplated by one skilled in the art. Alternatively, portions of the server appliance data may be distributed to a plurality of client information handling systems by computing available storage on each client information handling system and then portioning accordingly, so as to divide the storage required on each client information handling system to provide the backup. Additionally, it may be preferable to store the server data on a portion of the storage device of the client information handling system that is inaccessible to a user of the system. For instance, data may be stored to a protected area of a disk drive, encrypted, and the like as contemplated by a person of ordinary skill in the art.

Figure 5:
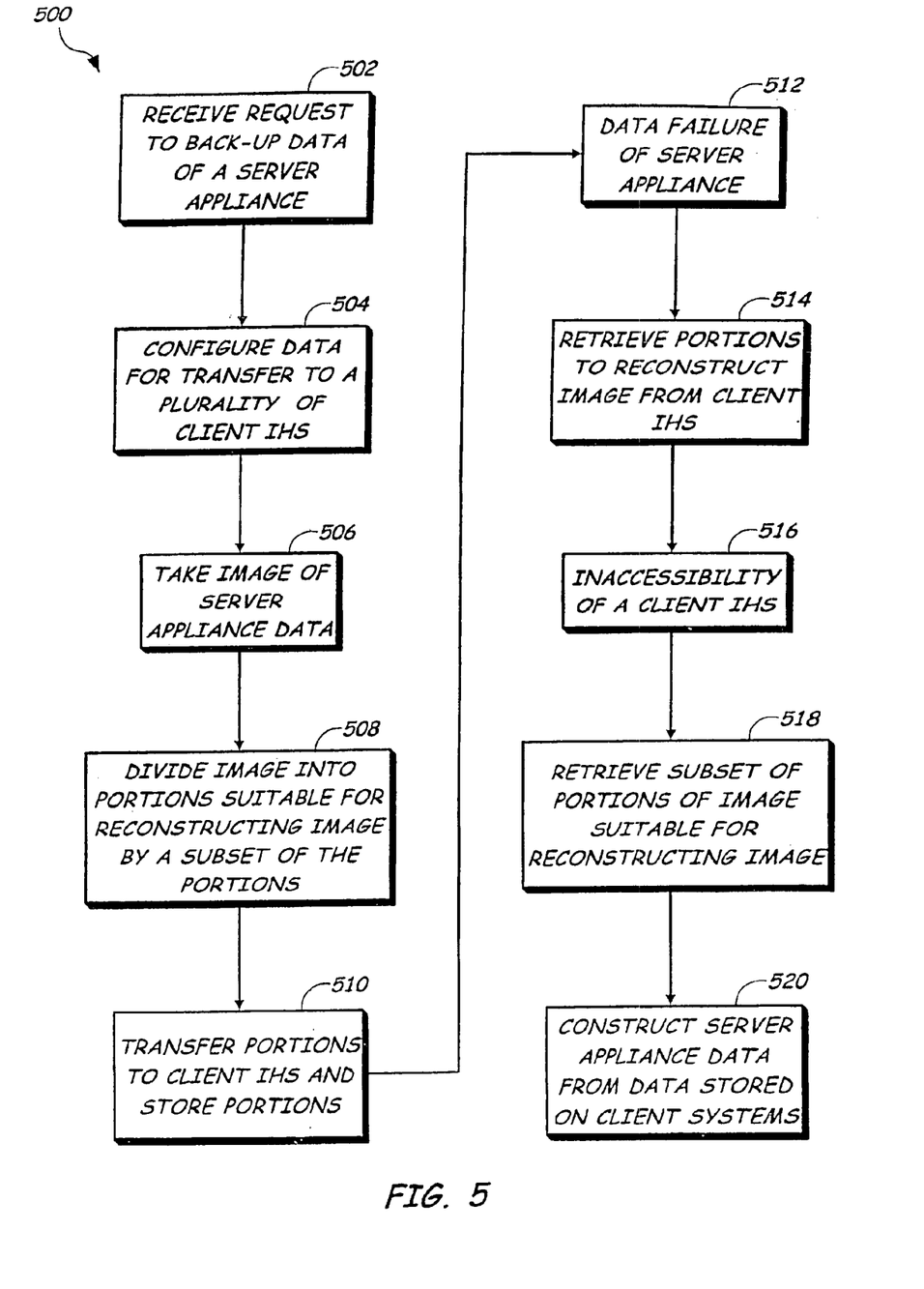
FIG. 5 is a flow diagram of an exemplary method of the present invention wherein an image of server data is divided into portions and distributed so as to enable the image to be reconstructed by a subset of the portions.

Referring now to FIG. 5, an exemplary method 500 of the present invention is shown wherein an image of server data is divided into portions and distributed so as to enable the image to be reconstructed by a subset of the portions. A request to backup data of a server appliance is received in step 502. Data of the server appliance is configured for transfer to a plurality of client information handling systems in step 504. For example, an image of the server data may be taken in step 506. The image is then divided into portions suitable for reconstructing the image by a subset of the portions in step 508. For example, the image may be divided into portions in accordance with various RAID schemes as contemplated by one skilled in the art. The portions are transferred to and stored on the client information handling systems in step 510.

Thus, if failure of the server appliance is encountered in step 512, portions of the image may be retrieved from the client information handling systems to reconstruct the image in step 514. Even in a client information handling system is inaccessible in step 516 (due to network, device, system failure, and the like), a subset of the portions of the image may be retrieved suitable for reconstructing the image in step 518. Thus, all or substantially of the server data may be reconstructed from data stored on a portion of the client information handling systems in step 520. In this way, a redundant distributed backup of server appliance data may be achieved. The server data may be retrieved and restored even if all of the client information handling systems are not accessible. It should be apparent that a wide variety of schemes may be employed to divide data between client systems to ensure data accessibility without departing from the spirit and scope of the present invention.

Figure 6:
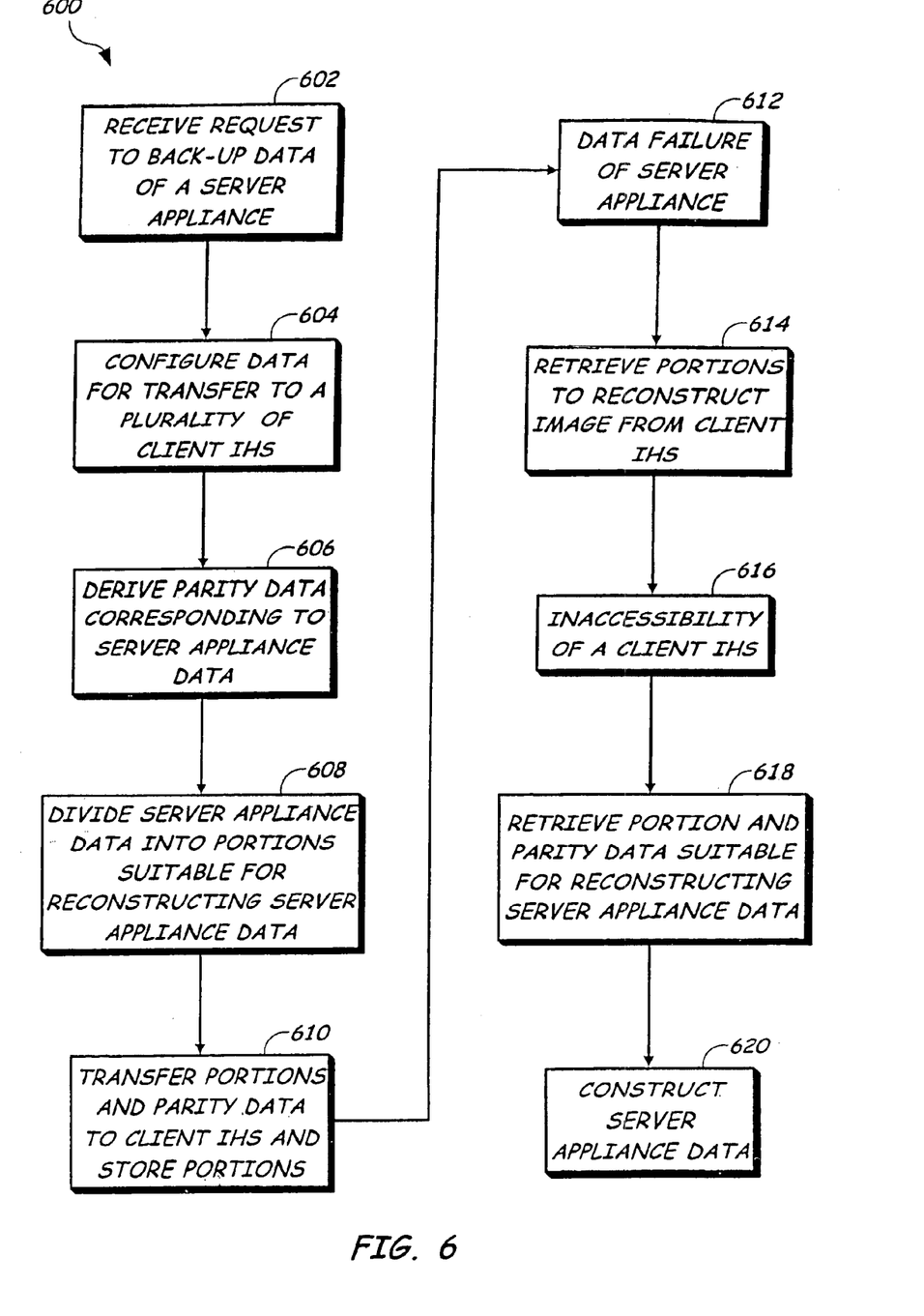
FIG. 6 is a flow diagram illustrating an exemplary method of the present invention in which parity data derived from server appliance data and portions of server appliance data are distributed to promote data integrity.

Referring now to FIG. 6, an exemplary method 600 of the present invention is shown wherein parity data derived from server appliance data and portions of server appliance data are distributed to promote data integrity. A request to backup data of a server appliance is received in step 602. Data is configured for transfer to a plurality of client information handling systems in step 604. For example, parity data may be derived corresponding to server appliance data in step 606, as contemplated by one skilled in the art. The server appliance data and the parity data may then be divided into portions suitable for reconstructing the server appliance data in step 608. These portions, including the parity data, are then transferred to and stored on the client information handling systems in step 610.

Therefore, when data failure of a server appliance is encountered in step 612, portions stored on client information handling systems may be retrieved to reconstruct server data in step 614. Even if inaccessibility of a client information handling system is met in step 616, portions may be retrieved, including the parity data, to reconstruct the data missing due to inaccessibility of the client information handling system in step 618. Thus, all or substantially of the server data may be reconstructed in step 620. Additionally, the parity data may be utilized for error correction of the server data during reconstruction in order to maintain data integrity, as contemplated by one skilled in the art.

Figure 7:
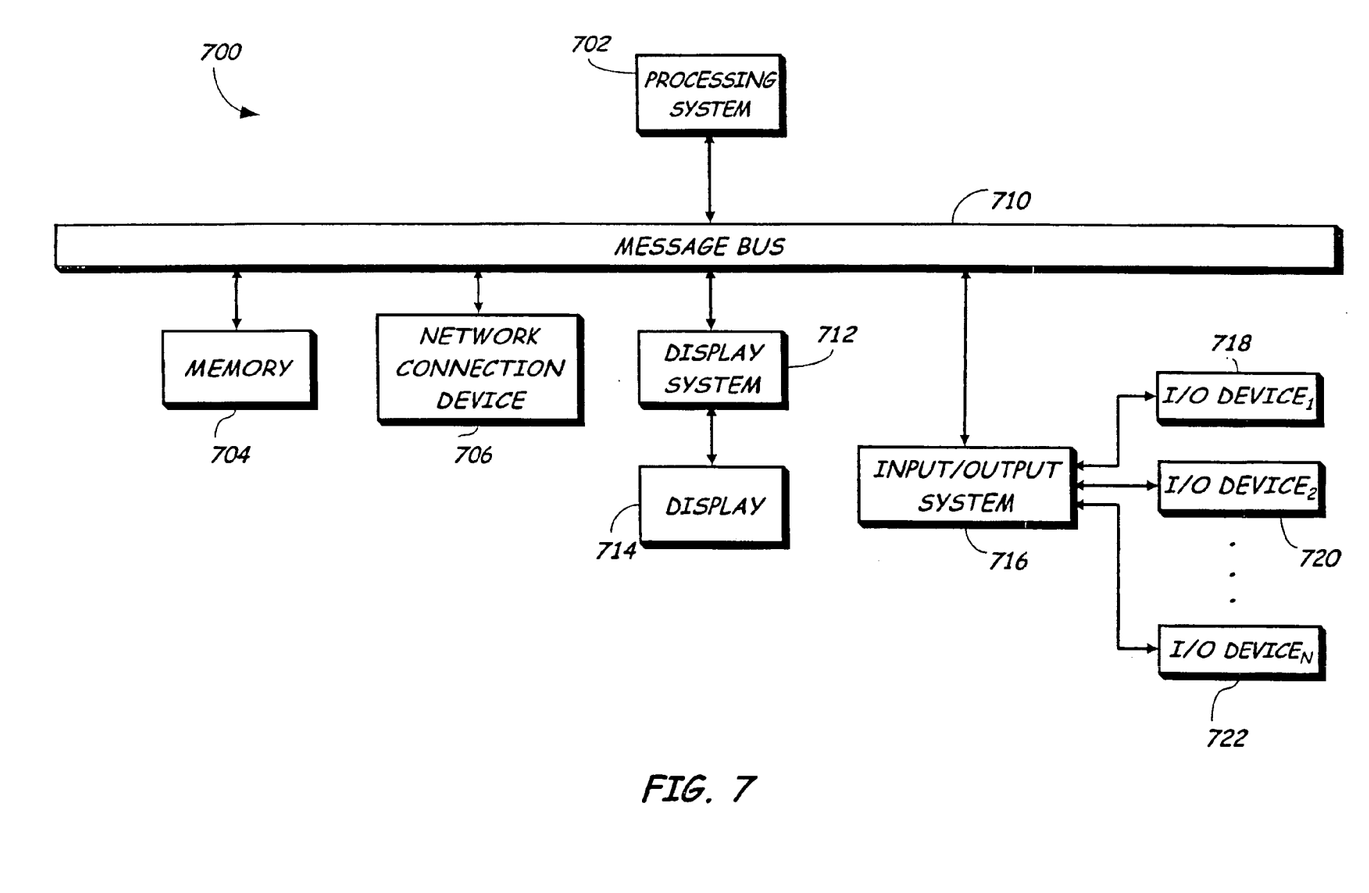
FIG. 7 is a block diagram of an embodiment of an information handling system operable to employ the present invention.

Referring now to FIG. 7, a hardware system in accordance with the present invention is shown. The hardware system shown in FIG. 7 is generally representative of the hardware architecture of an information handling system 700 operable to employ and embody the present invention. An information handling system 700 may include a digital information appliance, convergence system, Internet appliance, and the like without departing from the spirit and scope of the present invention. A controller, for example, a processing system 702, controls the information handling system 700. The processing system 702 includes a central processing unit, such as a microprocessor or microcontroller for executing programs, performing data manipulations and controlling the tasks of the information handling system 700. Communication with the processing system 702 may be implemented through a system bus 710 for transferring information among the components of the information handling system 700. The system bus 710 may include a data channel for facilitating information transfer between storage and other peripheral components of the information handling system 700. The system bus 710 further provides the set of signals required for communication with the processing system 702, including a data bus, address bus, and control bus. The system bus 710 may comprise any state of the art bus architecture according to promulgated standards, for example, industry standard architecture (ISA), extended industry standard architecture (EISA), Micro Channel Architecture (MCA), peripheral component interconnect (PCI) local bus, and standards promulgated by the Institute of Electrical and Electronics Engineers (IEEE) including IEEE 488 general-purpose interface bus (GPIB), IEEE 696/S600, and the like. Furthermore, the system bus 710 may be compliant with any promulgated industry standard. For example, the system bus 710 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE 1394, Apple Desktop Bus (ADB), Concentration Highway Interface (CHI), Fire Wire, Geo Port, or Small Computer Systems Interface (SCSI).

Additionally, the information handling system 700 includes a memory 704. In one embodiment, memory 704 is provided on SIMMs (Single In-line Memory Modules), while in another embodiment, memory 704 is provided on DIMMs (Dual In-line Memory Modules), each of which plugs into suitable sockets provided on a motherboard holding many of the other components shown in FIG. 7. Memory 704 includes standard DRAM (Dynamic Random-Access Memory), EDO (Extended Data Out) DRAM, SDRAM (Synchronous DRAM), or other suitable memory technology. Memory 704 may also include auxiliary memory to provide storage of instructions and data that are loaded into the memory 704 before execution. Auxiliary memory may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM).

The information handling system 700 further includes a network connection device 706. The network connection device 706 communicates between the information handling system 700 and a remote device, such as external devices, networks, information sources, or host systems that administer a plurality of information handling systems. For example, host systems such as a server or information handling system, may run software controlling the information handling system, serve as storage for an information handling system, or coordinate software running separately on each information handling system. The network connection device 706 may provide or receive analog, digital, or radio frequency data. The network connection device 706 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLWI/PPP), Universal Serial Bus (USB), and the like. For example, the network connection device 706 may comprise a network adapter, serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 700 further includes a display system 712 for connecting to a display device 714. The display system 712 may comprise a video display adapter having all of the components for driving the display device, including video random access memory (VRAM), buffer, and graphics engine as desired. The display device 714 may comprise a liquid-crystal display (LCD), or may comprise alternative type of display technologies, such as a light-emitting diode (LED) display, gas or plasma display, or employ flat-screen technology.

An information handling system 700 may further include an input/output (I/O) system 716 for connecting to one or more I/O devices 718, 720, and up to N number of I/O devices 722. Input/output system 716 may comprise one or more controllers or adapters for providing interface functions between one or more of I/O devices 718–722. For example, input/output system 716 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 700 shown in FIG. 7 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 704 of one or more information handling systems 700 configured generally as described in FIG. 7. Until required by the information handling system 700, the set of instructions may be stored in another readable memory device, for example, in a hard disk drive or in a removable memory, such as an optical disc for utilization in a CD-ROM drive, a floppy disk for utilization in a floppy disk drive, a floppy/optical disc for utilization in a floppy/optical drive, or a personal computer memory card for utilization in a personal computer card slot. Further, the set of instructions can be stored in the memory 704 of an information handling system 700 and transmitted over a local area network or a wide area network, such as the Internet, when desired by the user. Additionally, the instructions may be transmitted over a network in the form of an applet that is interpreted or compiled after transmission to the information handling system 700 rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for providing a data backup of a server on client systems in a network and many of its attendant advantages will be understood by the foregoing description. It is also believed that it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system suitable for providing a backup of electronic data, comprising:

a network;

a server appliance coupled to the network, the server appliance including a data storage device suitable for storage of electronic data; and a plurality of client information handling systems coupled to the server appliance over the network, each client information handling system including a data storage device suitable for storage of the electronic data stored on the server appliance, wherein portions of the electronic data stored on the server appliance are transferred over the network and stored on the plurality of client information handling systems, the portions of the electronic data stored on the plurality of client information handling systems being suitable for restoring substantially all of the electronic data stored on the server appliance.

2. The system as described in claim 1, wherein parity data corresponding to the electronic data stored on the server appliance is derived and stored on the plurality of client information handling systems.

3. The system as described in claim 2, wherein, if at least one of the plurality of client information handling systems is unavailable and includes one of the portions of the electronic data, the portions of the electronic data and the parity data stored on other available ones of the plurality of client information handling systems are suitable for restoring substantially all of the electronic data stored on the server appliance.

4. The system as described in claim 2, wherein the parity data is suitable for correcting errors in the restored electronic data stored on the server appliance.

5. The system as described in claim 1, wherein at least one of the portions of the electronic data is stored on at least two of the plurality of client information handling systems such that, if at least one of the plurality of client information handling systems is unavailable and includes one of the portions of the electronic data, the portions of the electronic data stored on other available ones of the plurality of client information handling systems are suitable for restoring substantially all of the electronic data stored on the server appliance.

6. The system as described in claim 1, wherein the portions of the electronic data stored on the server appliance are transferred over the network to the plurality of client information handling systems based on at least one of: a RAID scheme and computed availability of storage space on the plurality of client information handling systems.

7. A system suitable for providing a backup of electronic data, comprising:

a network;

a server appliance coupled to the network, the server appliance including a data storage device suitable for storage of electronic data; and a plurality of client information handling systems coupled to the server appliance over the network, each client information handling system including a data storage device suitable for storage of the electronic data stored on the server appliance, wherein portions of the electronic data stored on the server appliance are transferred over the network and stored on the plurality of client information handling systems such that, if at least one of the plurality of client information handling systems is unavailable and includes one of the portions of the electronic data, the portions of the electronic data stored on other available ones of the plurality of client information handling systems are suitable for restoring substantially all of the electronic data stored on the server appliance.

8. The system as described in claim 7, wherein parity data corresponding to the electronic data stored on the server appliance is derived and stored on the plurality of client information handling systems.

9. The system as described in claim 8, wherein the portions of the electronic data and the parity data stored on the other available ones of the plurality of client information handling systems are suitable for restoring substantially all of the electronic data stored on the server appliance.

10. The system as described in claim 8, wherein the parity data is suitable for correcting errors in the restored electronic data stored on the server appliance.

11. The system as described in claim 7, wherein at least one of the portions of the electronic data is stored on at least two of the plurality of client information handling systems.

12. The system as described in claim 7, wherein the portions of the electronic data stored on the server appliance are transferred over the network to the plurality of client information handling systems based on at least one of: a RAID scheme and computed availability of storage space on the plurality of client information handling systems.

13. A method of providing a backup of electronic data on a server appliance utilizing a plurality of client information handling systems communicatively coupled to the server appliance over a network, comprising the steps of:

receiving a request for the backup of the electronic data stored on the server appliance;

configuring the electronic data stored on the server appliance for transfer to the plurality of client information handling systems over the network;

transferring portions of the electronic data from the server appliance to the plurality of client information handling systems over the network; and storing the portions of the electronic data on the plurality of client information handling systems, the portions of the electronic data stored on the plurality of client information handling systems being suitable for restoring substantially all of the electronic data stored on the server appliance.

14. The method as described in claim 13, further comprising the step of:

after failure of the server appliance, restoring substantially all of the electronic data stored on the server appliance to another server appliance solely based on the portions of the electronic data stored on the plurality of client information handling systems.

15. The method as described in claim 13, further comprising the steps of:
deriving parity data corresponding to the electronic data stored on the server appliance; and
storing the parity data on the plurality of client information handling systems.

16. The method as described in claim 15, further comprising the step of:
after failure of the server appliance, if at least one of the plurality of client information handling systems is unavailable and includes one of the portions of the electronic data, restoring substantially all of the electronic data stored on the server appliance to another server appliance solely based on the portions of the electronic data and the parity data stored on other available ones of the plurality of client information handling systems.

17. The method as described in claim 15, further comprising the steps of:
after failure of the server appliance, restoring substantially all of the electronic data stored on the server appliance to another server appliance solely based on the portions of the electronic data stored on the plurality of client information handling systems; and
correcting errors in the restored electronic data stored on the server appliance based on the parity data.

18. The method as described in claim 13, wherein at least one of the portions of the electronic data is stored on at least two of the plurality of client information handling systems, and further comprising the step of:
after failure of the server appliance, if at least one of the plurality of client information handling systems is unavailable and includes one of the portions of the electronic data, restoring substantially all of the electronic data stored on the server appliance to another server appliance solely based on the portions of the electronic data stored on other available ones of the plurality of client information handling systems.

19. The method as described in claim 13, wherein the configuring step further comprises the step of:
dividing the electronic data stored on the server appliance into the portions of the electronic data based on at least one of: a RAID scheme and computed availability of storage space on the plurality of client information handling systems.

20. A method of providing a backup of electronic data on a server appliance utilizing a plurality of client information handling systems communicatively coupled to the server appliance over a network, comprising the steps of:
receiving a request for the backup of the electronic data stored on the server appliance;
configuring the electronic data stored on the server appliance for transfer to the plurality of client information handling systems over the network;
transferring portions of the electronic data from the server appliance to the plurality of client information handling systems over the network; and
storing the portions of the electronic data on the plurality of client information handling systems such that, if at least one of the plurality of client information handling systems is unavailable and includes one of the portions of the electronic data, the portions of the electronic data stored on other available ones of the plurality of client information handling systems are suitable for restoring substantially all of the electronic data stored on the server appliance.

21. The method as described in claim 20, further comprising the step of:
after failure of the server appliance, restoring substantially all of the electronic data stored on the server appliance to another server appliance solely based on the portions of the electronic data stored on the plurality of client information handling systems.

22. The method as described in claim 20, further comprising the steps of:
deriving parity data corresponding to the electronic data stored on the server appliance; and
storing the parity data on the plurality of client information handling systems.

23. The method as described in claim 22, further comprising the step of:
after failure of the server appliance, restoring substantially all of the electronic data stored on the server appliance to another server appliance solely based on the portions of the electronic data and the parity data stored on the other available ones of the plurality of client information handling systems.

24. The method as described in claim 20, wherein at least one of the portions of the electronic data is stored on at least two of the plurality of client information handling systems, and further comprising the step of:
after failure of the server appliance, restoring substantially all of the electronic data stored on the server appliance to another server appliance solely based on the portions of the electronic data stored on the other available ones of the plurality of client information handling systems.

25. The method as described in claim 20, wherein the configuring step further comprises the step of:
dividing the electronic data stored on the server appliance into the portions of the electronic data based on at least one of: a RAID scheme and computed availability of storage space on the plurality of client information handling systems.

* * * * *